United States Patent

Nakamura et al.

[11] Patent Number: 6,061,316
[45] Date of Patent: May 9, 2000

[54] MULTI-TRACK RECORDING/ REPRODUCING APPARATUS, RECORDING/ REPRODUCING METHOD, AND INFORMATION RECORDING MEDIUM

[75] Inventors: Tadashi Nakamura, Katano; Norio Miyatake, Kobe, both of Japan

[73] Assignee: Matsushita Electric Industrial Co., Ltd., Osaka, Japan

[21] Appl. No.: 08/939,231

[22] Filed: Sep. 29, 1997

[30] Foreign Application Priority Data

Sep. 30, 1996 [JP] Japan .................................. 8-258081

[51] Int. Cl.⁷ ...................................................... G11B 3/90
[52] U.S. Cl. .............................................. 369/54; 369/116
[58] Field of Search .................................. 369/54, 58, 116, 369/32, 44.26, 44.27, 44.28, 44.32, 47, 48, 275.2, 275.3

[56] References Cited

U.S. PATENT DOCUMENTS 5,070,495  12/1991  Bletscher, Jr. et al. ................. 369/116
5,450,383  9/1995  Call et al. .
5,757,759  5/1998  Takahashi et al. ..................... 369/116

FOREIGN PATENT DOCUMENTS 6-259769  9/1994  Japan .

Primary Examiner—Paul W. Huber
Attorney, Agent, or Firm—Ratner & Prestia

[57] ABSTRACT

A recording/reproducing apparatus for recording data in or reproducing data from an information recording medium having a plurality of tracks includes: an optical head outputting a laser beam; a driving circuit driving the optical head; a signal level measuring device measuring a level of a signal reproduced from the information recording medium; and a controller recording data on one of the plurality of tracks using the laser beam output from the optical head, controlling the driving circuit in such a manner that a signal is reproduced from a track adjacent to the track on which the data is recorded, measuring a level of the signal reproduced from the adjacent track using the signal level measuring device, and determining an optimum value of an output value of the laser beam output from the optical head in accordance with the level of the signal reproduced from the adjacent track.

23 Claims, 13 Drawing Sheets

MULTI-TRACK RECORDING/ REPRODUCING APPARATUS, RECORDING/ REPRODUCING METHOD, AND INFORMATION RECORDING MEDIUM

BACKGROUND OF THE INVENTION

1. Field of the Invention

The present invention relates to a recording/reproducing apparatus, a recording/reproducing method, and an information recording medium. In particular, the present invention relates to a recording/reproducing apparatus, a recording/reproducing method, and an information recording medium which enable an optimum recording laser output value to be obtained.

2. Description of the Related Art

In an apparatus for optically recording/reproducing information, the sizes of marks to be formed on an information recording medium are varied depending upon the intensity of a recording laser output. Thus, in order to secure compatibility between media and to record data with accuracy, it is required to appropriately set a recording laser output value. When a recording laser output is not sufficient, the sizes of marks become smaller. In this case, the amplitude of a reproduced signal becomes smaller, making it impossible to correctly reproduce data. In contrast, when an excess recording laser output is given, the sizes of marks become larger. Therefore, a signal is written not only on a track on which data is to be written but also on an adjacent track, i.e., crosserase occurs.

In the case where crosserase occurs, when data is written on a track B adjacent to a track A, data on the track A is overwritten with the data on the track B. This causes the quality of a reproduced signal from the track A to degrade, resulting in that a correct reproduced signal cannot be obtained from the track A.

In general, there is variation in characteristics in an information recording medium. Moreover, the surrounding environment varies. Therefore, a recording laser output value is not constant. In order to overcome this problem, in a conventional apparatus for optically recording/ reproducing information, test data is recorded in and reproduced from a test region in an information recording medium prior to writing data, and the amplitude of a reproduced signal from the test region is checked, whereby an optimum recording laser output is set.

However, in the conventional apparatus, test data is recorded in and reproduced from an identical track. Therefore, it is impossible to accurately estimate an influence of a recording laser output on an adjacent track when an excess recording laser output is given. Thus, the conventional apparatus cannot prevent the quality of a signal from degrading due to crosserase. Furthermore, in recent years, high-density recording has been demanded for the purpose of increasing the capacity of an information recording medium. This requires tracks of the information recording medium to be narrower. Accordingly, it will become more important to overcome the problem of the degradation of a signal quality due to crosserase.

SUMMARY OF THE INVENTION

According one aspect of the present invention, a recording/reproducing apparatus for recording data in or reproducing data from an information recording medium having a plurality of tracks, includes: an optical head outputting a laser beam; a driving circuit driving the optical head; a signal level measuring device measuring a level of a signal reproduced from the information recording medium; and a controller recording data on one of the plurality of tracks using the laser beam output from the optical head, controlling the driving circuit in such a manner that a signal is reproduced from a track adjacent to the track on which the data is recorded, measuring a level of the signal reproduced from the adjacent track using the signal level measuring device, and determining an optimum value of an output value of the laser beam output from the optical head in accordance with the level of the signal reproduced from the adjacent track.

In one embodiment of the present invention, the driving circuit drives the optical head in such a manner that the data is recorded on one of the plurality of tracks while varying the output value of the laser beam output from the optical head.

In another embodiment of the present invention, the driving circuit varies the output value of the laser beam by varying a power value of the laser beam.

In another embodiment of the present invention, the driving circuit varies the output value of the laser beam by varying a duty ratio of the laser beam.

In another embodiment of the present invention, the driving circuit drives the optical head in such a manner that the data is recorded on one of the plurality of tracks while varying a focus of the laser beam output from the optical head.

In another embodiment of the present invention, the plurality of tracks include a plurality of tracks having a first characteristic and a plurality of tracks having a second characteristic, one of the plurality of tracks having the first characteristic and one of the plurality of tracks having the second characteristic are disposed alternately, and the controller controls the driving circuit in such a manner that data is recorded on one of the plurality of tracks having the first characteristic and a signal is reproduced from a track having the second characteristic adjacent to the track on which the data is recorded.

According to another aspect of the present invention, a recording/reproducing method for recording data in or reproducing data from an information recording medium having a plurality of tracks, includes: a first step of recording data on one of the plurality of tracks using a laser beam and reproducing a signal from a track adjacent to the track on which the data is recorded; and a second step of measuring a level of a signal reproduced from the adjacent track and determining an optimum value of an output value of the laser beam in accordance with the level of the signal reproduced from the adjacent track.

In one embodiment of the present invention, the first step includes a step of recording the data on one of the plurality of tracks while varying the output value of the laser beam.

In another embodiment of the present invention, the output value of the laser beam is varied by varying a power value of the laser beam.

In another embodiment of the present invention, the output value of the laser beam is varied by varying a duty ratio of the laser beam.

In another embodiment of the present invention, the first step includes a step of recording the data on one of the plurality of tracks while varying a focus of the laser beam.

In another embodiment of the present invention, the plurality of tracks include a plurality of tracks having a first characteristic and a plurality of tracks having a second characteristic, one of the plurality of tracks having the first characteristic and one of the plurality of tracks having the second characteristic are disposed alternately, and the first step includes a step of recording data on one of the plurality of tracks having the first characteristic and reproducing a signal from a track having the second characteristic adjacent to the track on which the data is recorded.

According to another aspect of the present invention, an information recording medium having a plurality of tracks for recording/reproducing data is provided. The plurality of tracks include: a track for recording data; and a track for reproducing a signal adjacent to the track on which the data is recorded.

In one embodiment of the present invention, the plurality of tracks include a plurality of tracks having a first characteristic and a plurality of tracks having a second characteristic, one of the plurality of tracks having the first characteristic and one of the plurality of tracks having the second characteristic are disposed alternately, data is recorded on one of the plurality of tracks having the first characteristic, and a signal is reproduced from a track having the second characteristic adjacent to the track on which the data is recorded.

In another embodiment of the present invention, the plurality of tracks having the first characteristic include a plurality of tracks provided in either land portions or groove portions.

In another embodiment of the present invention, the plurality of tracks include a track provided in a data zone and a track provided in a first zone, data is recorded on the track provided in the first zone, and a signal is reproduced from a track provided in the first zone adjacent to the track on which the data is recorded.

In another embodiment of the present invention, the first zone includes a zone provided on an inner periphery with respect to the data zone.

In another embodiment of the present invention, the first zone includes a zone provided on an outer periphery with respect to the data zone.

In another embodiment of the present invention, the first zone includes a zone provided on an outer periphery with respect to the data zone.

In another embodiment of the present invention, data is recorded on a first track provided in the data zone, and a signal is reproduced from a second track provided in the data zone adjacent to the first track on which the data is recorded.

In another embodiment of the present invention, the data zone includes a second data zone divided per track under a predetermined condition, and the first track and the second track are provided per the second data zone.

As described above, the recording/reproducing apparatus according to the present invention is capable of writing test data on a track in a test region on an information recording medium while varying a laser output value and of obtaining an optimum recording laser output value by comparing a level of a reproduced signal from a track adjacent to the track on which the test data is written with a previously determined allowable level of a value of a signal generated by crosserase. Thus, even when an information recording medium is replaced or the surrounding environment changes, the apparatus can set an optimum recording laser output value in such a manner as to prevent the quality of a signal from degrading due to crosserase.

Thus, the invention described herein makes possible the advantages of (1) providing a recording/reproducing apparatus capable of setting an optimum recording laser output value in such a manner as to prevent a signal quality from degrading due to crosserase; (2) providing a recording/reproducing method capable of setting an optimum recording laser output value in such a manner as to prevent a signal quality from degrading due to crosserase; and (3) providing an information recording medium capable of setting an optimum recording laser output value in such a manner as to prevent a signal quality from degrading due to crosserase.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

Embodiment 1

Figure 1:
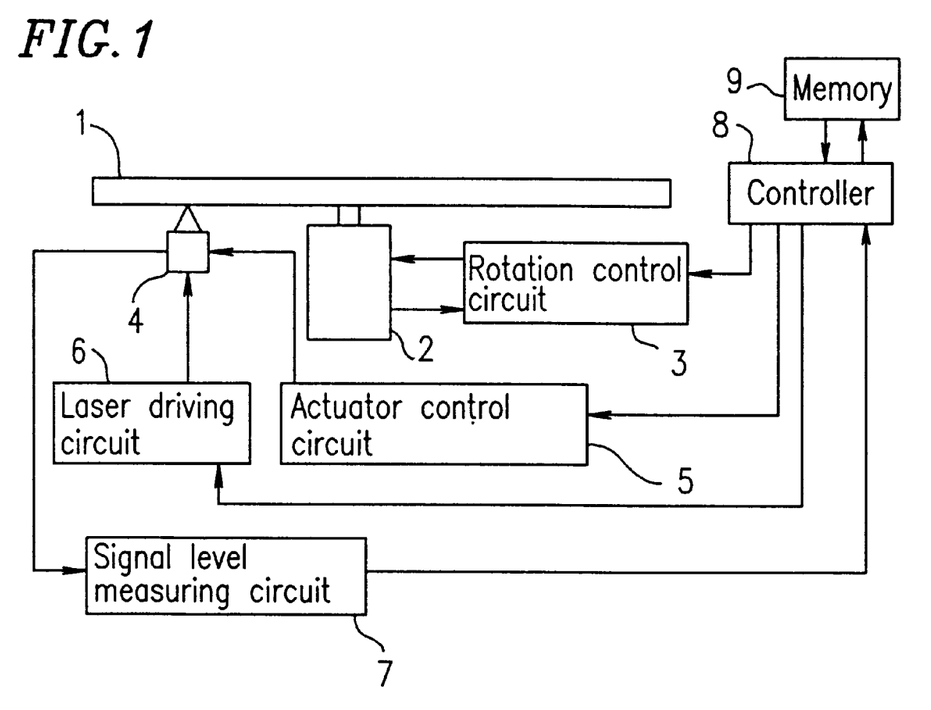
FIG. 1 is a block diagram showing a configuration of an apparatus for optically recording/reproducing information according to the present invention.

FIG. 1 is a block diagram showing a configuration of an apparatus for optically recording/reproducing information according to the present invention.

The apparatus for optically recording/reproducing information includes a motor 2 rotating a disk 1 which is an information recording medium on which data is recorded, a rotation control circuit 3 controlling the number of rotation of the motor 2, an optical head 4 irradiating a laser beam from a semiconductor laser onto a recording surface of the disk 1, a laser driving circuit 6 which changes an output value of a laser beam output from the optical head 4 based on data transmitted from a controller 8 (described later), an actuator control circuit 5 moving the optical head 4 in a radius direction of the disk 1, a signal level measuring circuit 7 measuring the level of a reproduced signal obtained from the optical head 4, the controller 8 controls the entire apparatus and performs a processing such as obtaining an optimum output value of a recording laser with respect to the disk 1, and a memory 9 which is a storage region used by the controller 8 for performing various processings.

In the above-mentioned configuration, when information is recorded on the disk 1, an instruction is given from the controller 8 to the rotation control circuit 3, and the motor 2 rotates the disk 1 in accordance with the instruction. The controller 8 sends an instruction to the actuator control circuit 5 so as to move the optical head 4 to an intended position of the disk 1. The optical head 4 irradiates a laser beam having an optimum output value, which has been previously obtained by the following method and has been set in the laser driving circuit 6, to the disk 1, whereby data is recorded on the disk 1.

When information recorded on the disk 1 is reproduced, the controller 8 sets a reproducing laser output value in the laser driving circuit 6, whereby the optical head 4 irradiates a laser beam to the disk 1. The signal level measuring circuit 7 detects a reproduced signal thus obtained and sends it to the controller 8, whereby the recorded information is reproduced.

Figure 2:
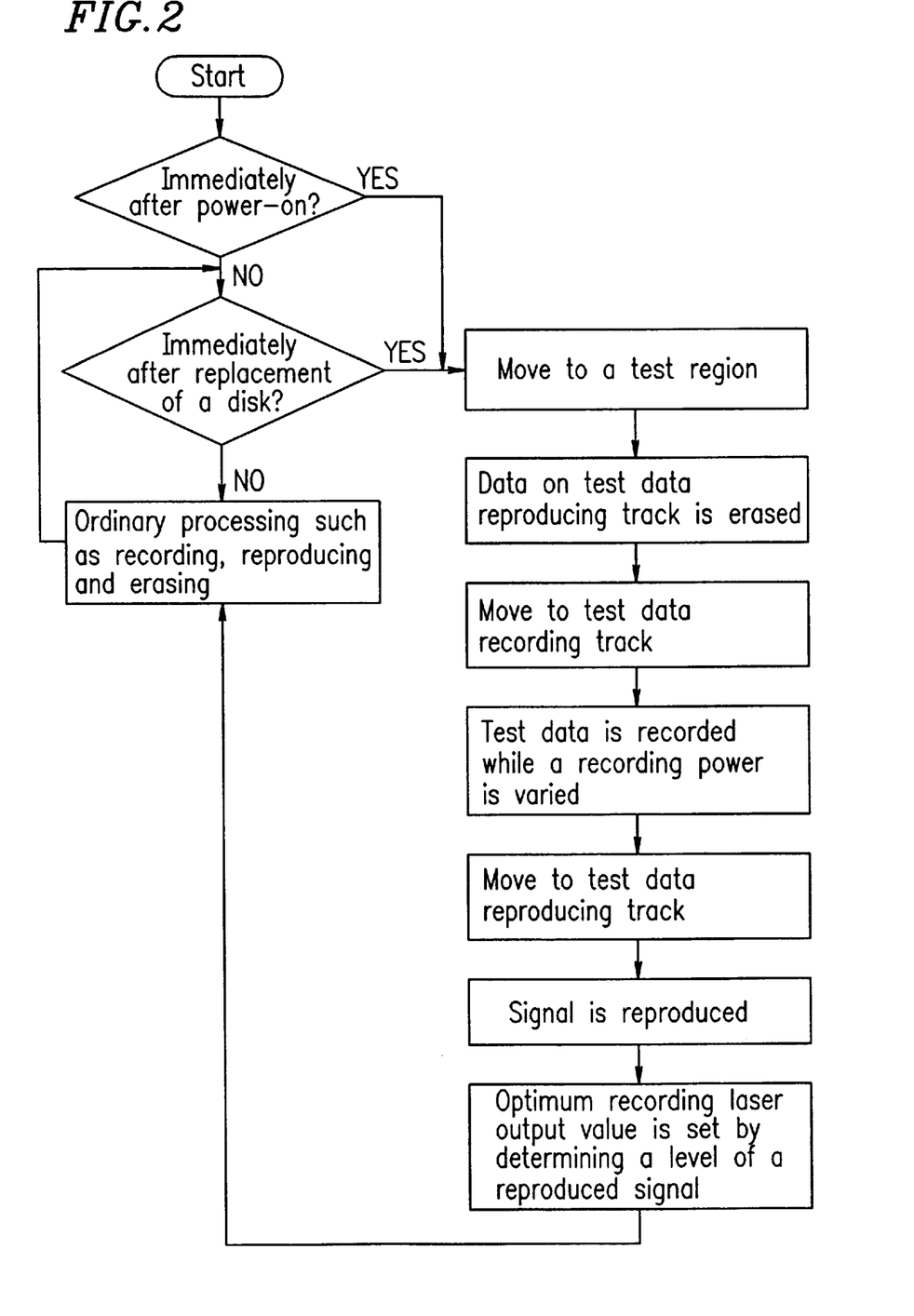
FIG. 2 is a flow chart showing an operation of an optimum recording laser output calculating unit in Embodiment 1 according to the present invention.

An operation of an optimum recording laser output calculating unit according to the present invention in the above-mentioned configuration will be described with reference to a flow chart shown in FIG. 2.

The process of setting an optimum recording laser output value is performed immediately after the apparatus for optically recording/reproducing information according to the present invention is powered on or when an information recording medium is newly inserted in the apparatus. Alternatively, this process is performed, if required, when the environment of the apparatus changes (e.g., when the apparatus temperature exceeds a certain range, when a predetermined period of time has passed after the commencement of the operation of the apparatus, etc.).

In the case where an optimum recording laser output value is set, the optical head 4 seeks a track in a test region and erases data on the track. This track will be used later for reproducing test data in order to obtain a reproduced signal required for obtaining an optimum recording laser output value (hereinafter, this track will be referred to as "test data reproducing track").

Figure 3:
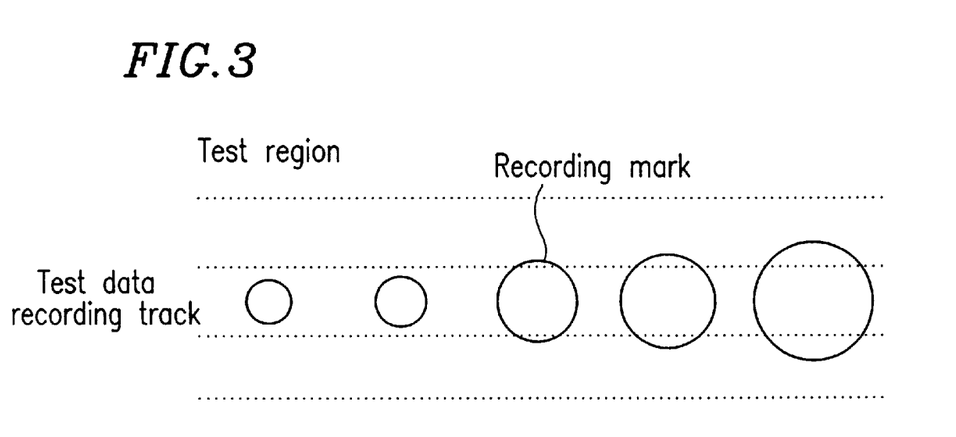
FIG. 3 is a diagram showing an example of recording of test data onto a test region in Embodiment 1 according to the present invention.

Next, the optical head 4 moves to a track adjacent to the track from which the data has been erased, and records test data in a predetermined pattern on the adjacent track (hereinafter, the track adjacent to the track from which the data has been erased will be referred to as "test data recording track"). At this time, recording is performed with a recording laser power value being varied successively. As a result, the widths of recorded marks are varied. FIG. 3 shows an example of test data recorded in this way. FIG. 3 exemplifies that recording is performed per bit and started at a lower power with the power increasing gradually.

Figure 4:
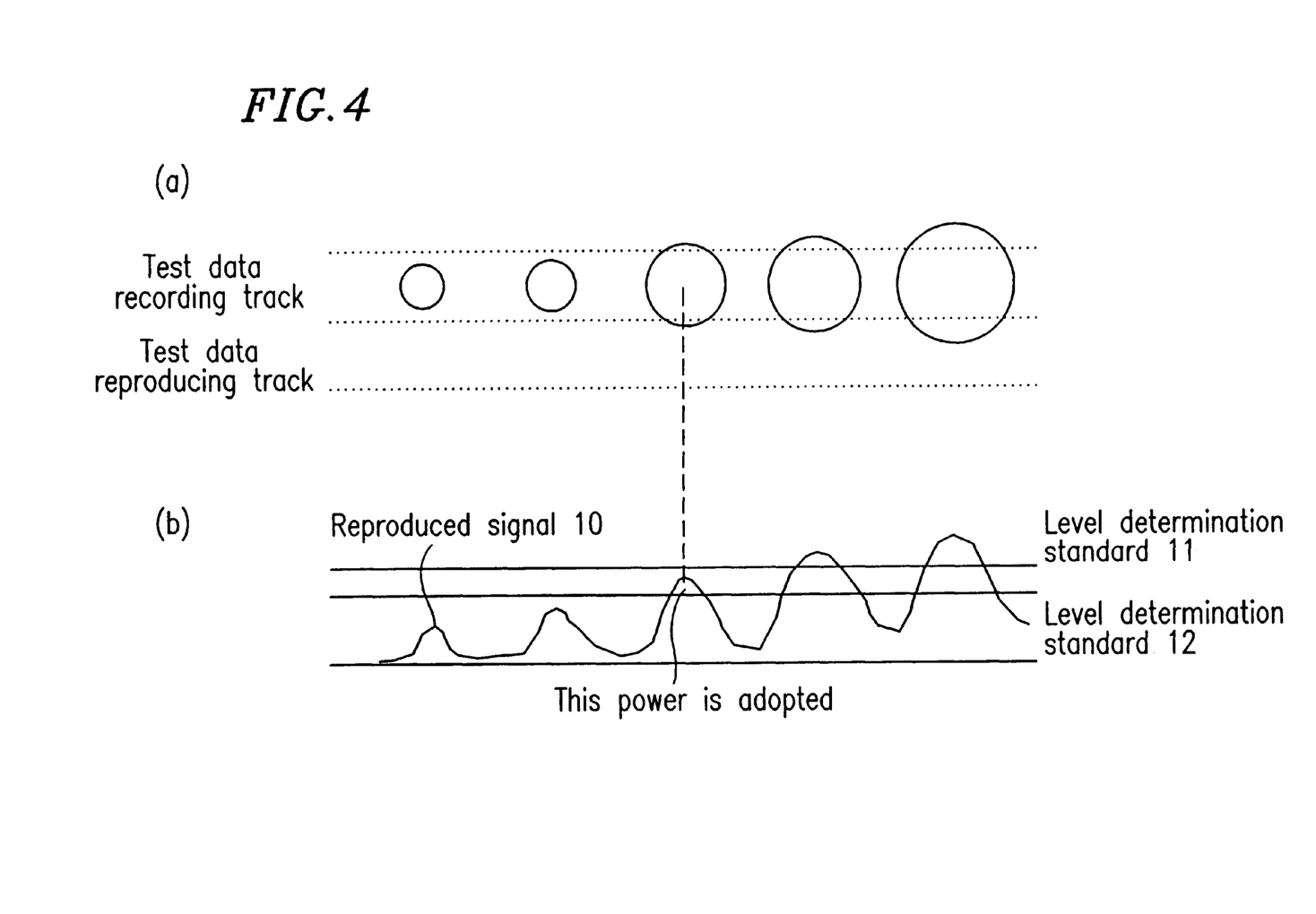
FIG. 4 is a diagram showing a reproduced signal of the test data in the test region and level determination standards in Embodiment 1 according to the present invention.

Next, as shown in (a) of FIG. 4, the optical head 4 moves to the test data reproducing track and reproduces a signal therefrom. At this time, the controller 8 performs a level determination processing using a level value of a reproduced signal obtained from the signal level measuring circuit 7.

The level value of the reproduced signal become a waveform 10 for example, as shown in (b) of FIG. 4. Two level determination standards 11 and 12 for determining the level value of the reproduced signal are previously set. The controller 8 determines which mark of the test data produces a signal falling in a range between the two level determination standards 11 and 12, and sets an output value of a laser beam which has written the mark satisfying this condition to be an optimum recording laser output value. The level determination standard 11 is a value which has been previously set from the allowable amount of crosserase with respect to an adjacent track. The level determination standard 12 is a signal level required for recording.

As described above, according to the present embodiment, even when the surrounding environment changes and/or there is variation in the recording sensitivity of an information recording medium, the recording/reproducing apparatus is capable of recording data with an optimum recording laser output value. Therefore, marks with appropriate sizes are always recorded on the recording information medium. This prevents crosserase from occurring.

Embodiment 2

Figure 5:
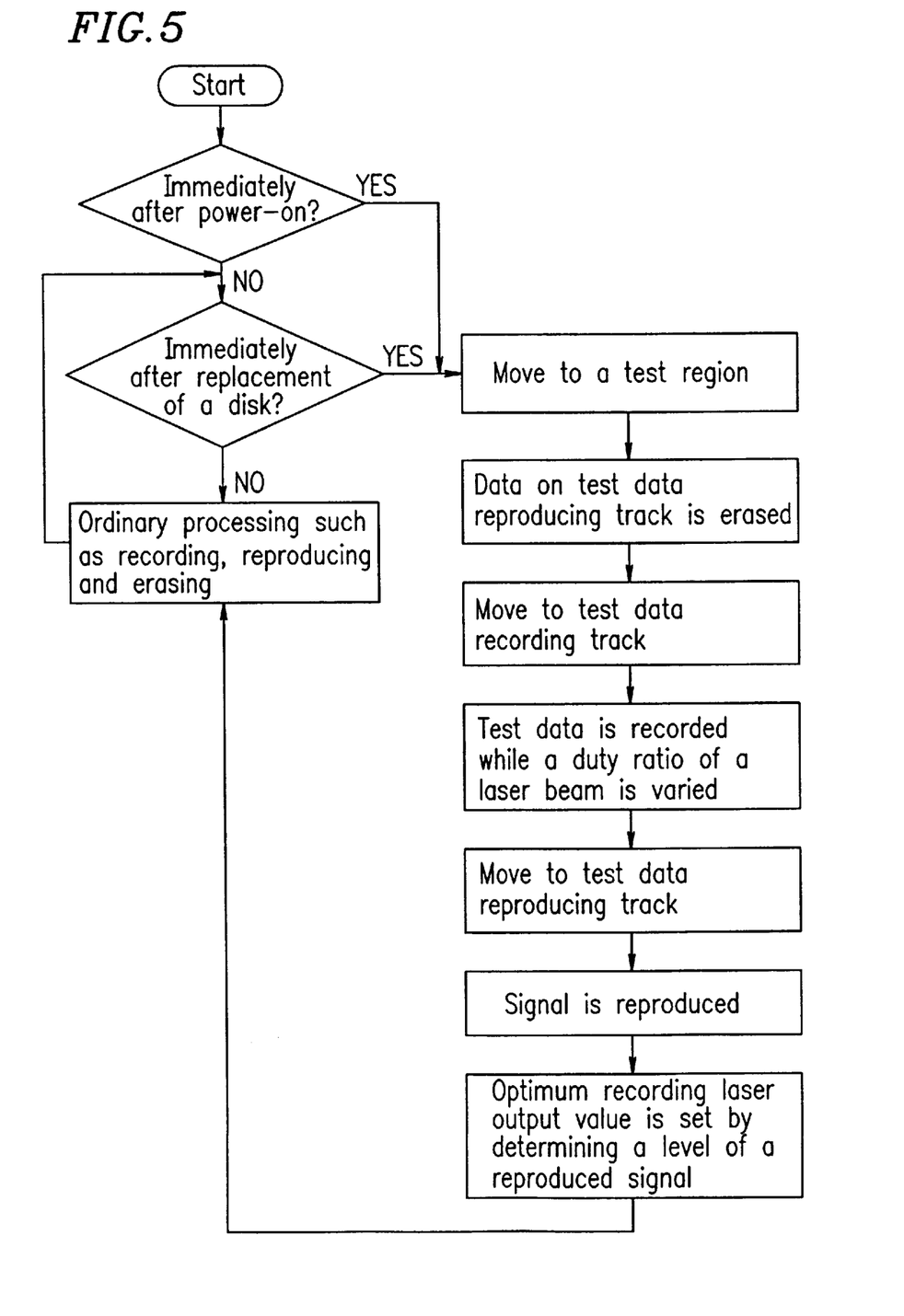
FIG. 5 is a flow chart showing an operation of an optimum recording laser output calculating unit in Embodiment 2 according to the present invention.

Embodiment 2 according to the present invention will be described with reference to the drawings. An operation of an optimum recording laser output calculating unit according to the present invention will be described in the configuration shown in FIG. 1 with reference to a flow chart shown in FIG. 5.

Figure 6:
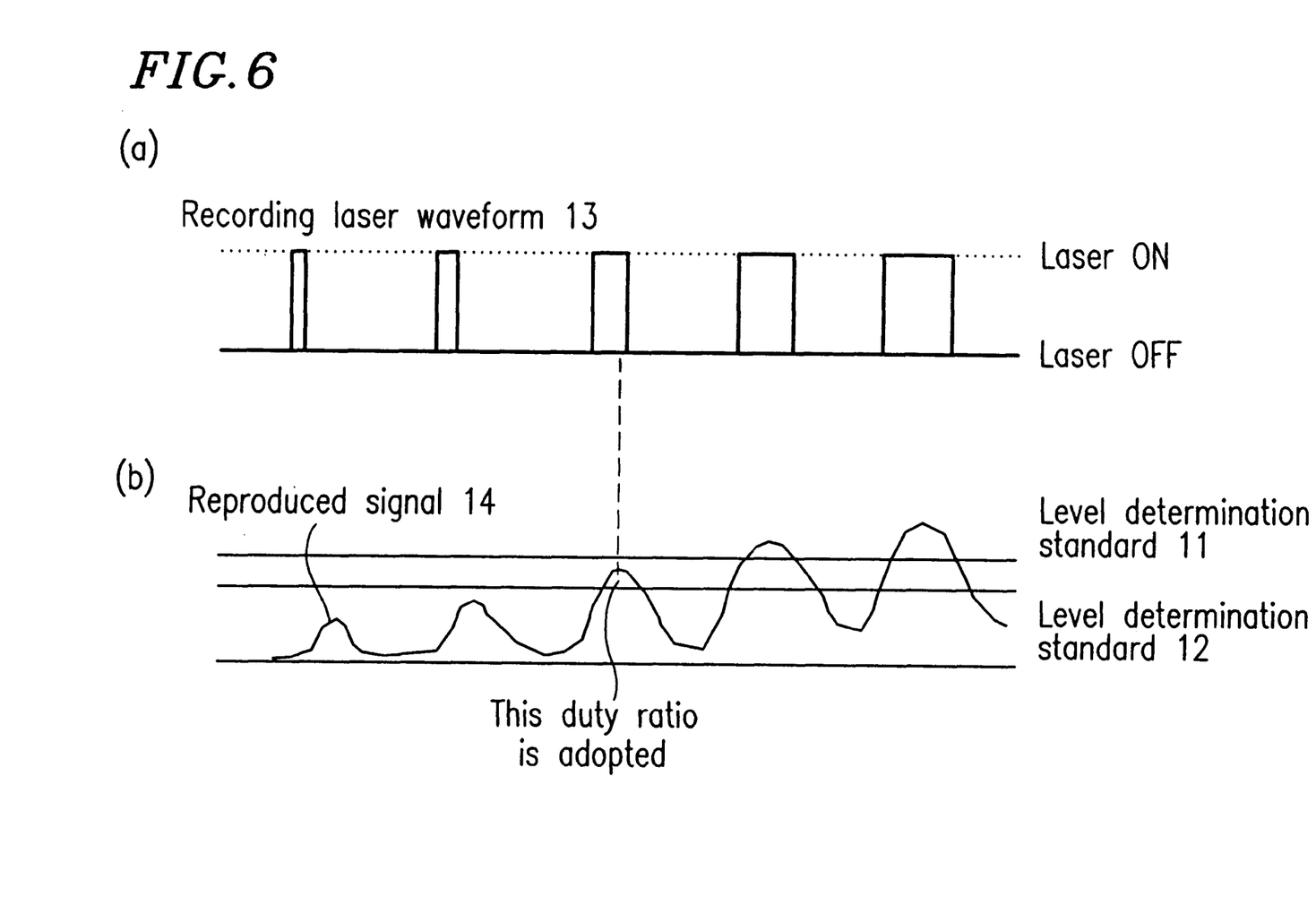
FIG. 6 is a diagram showing a reproduced signal in a test region and level determination standards in Embodiment 2 according to the present invention.

In Embodiment 2, the optical head 4 seeks a test region and erases data on a test data reproducing track in the same manner as that described in Embodiment 1. The controller 8 records data on a test data recording track while changing a duty ratio of a laser output. For example as represented by a recording laser waveform 13 shown in (a) of FIG. 6, the controller 8 starts recording with a small duty ratio and gradually increases the duty ratio. When the optical head 4 reproduces the data thus recorded from the test data reproducing track in the same way as in Embodiment 1, a reproduced signal 14 similar to that shown in (b) of FIG. 4 is obtained as shown in (a) of FIG. 6. Thus, an optimum recording laser output value can be calculated.

Even when data is recorded on the test data recording track while a focus of a laser beam is being varied, the reproduced signal 14 similar to that shown in (b) of FIG. 4 can be obtained by allowing the optical head 4 to reproduce a signal from the test data reproducing track in the same way as in Embodiment 1. Thus, an optimum recording laser output value can be calculated.

Embodiment 3

Embodiment 3 according to the present invention will be described with reference to the drawings. An operation of an optimum recording laser output calculating unit according to the present invention will be described in the configuration shown in FIG. 1 with reference to FIG. 7.

Figure 7:
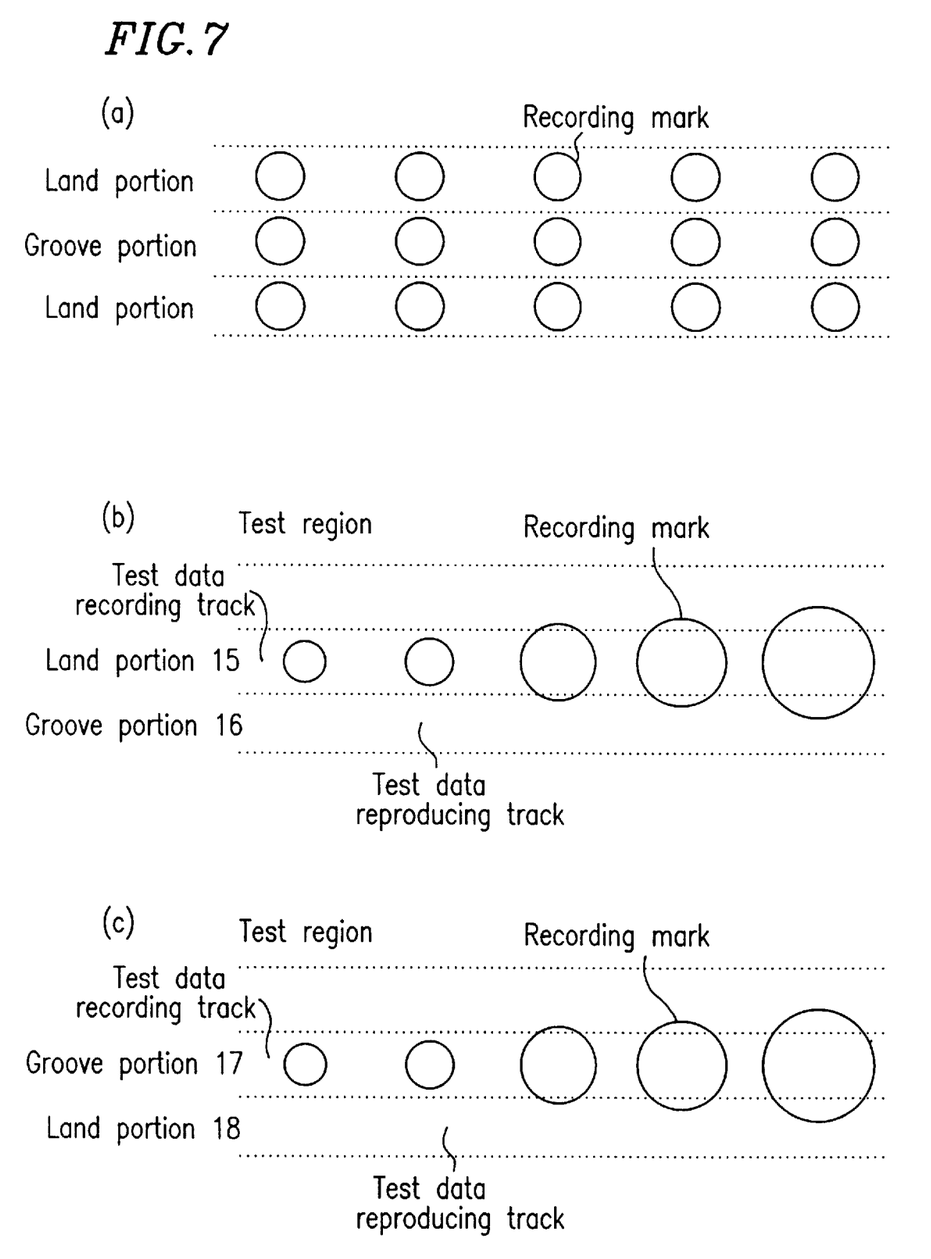
FIG. 7 is a diagram showing a reproduced signal in a test region in Embodiment 3 according to the present invention.

An information recording medium in the present embodiment has a land portion and a groove portion as shown in (a) of FIG. 7. Data is recorded on both portions. An optimum recording laser output value in this configuration is obtained in the same way as in Embodiments 1 and 2. It is noted that the optimum recording laser output value is calculated with respect to the land portion and the groove portion of the information recording medium. More specifically, as shown in (b) of FIG. 7, the recording/reproducing apparatus writes data on a track in a land portion 15 in a test region while varying an output value of a laser beam and reproduces data from a track in an adjacent groove portion 16, whereby an optimum recording laser output value is calculated. As shown in (c) of FIG. 7, the apparatus writes data on a track in a groove portion 17 in the test region while varying an output value of a laser beam and reproduces data from a track in an adjacent land portion 18, whereby an optimum recording laser output value is calculated.

As described above, according to the present embodiment, irrespective of the variation in characteristics of the land portion and the groove portion of the information recording medium, data can be recorded with an optimum recording laser output value. Therefore, marks with appropriate sizes are always recorded on the recording medium. As a result, crosserase can be prevented.

In the above-mentioned Embodiments 1, 2, and 3, test data to be written in a test region is recorded with a laser output being varied per bit. However, the present invention is not limited to a format of test data per bit. The laser output may be varied per two or more bits of data, per sector, etc. Furthermore, the laser output value can be varied continuously or changed from a high power or a high duty ratio.

Furthermore, the level determination standards 11 and 12 may be stored in the memory 9 or recorded on an information recording medium.

Embodiment 4

Embodiment 4 according to the present invention will be described with reference to the drawings. Information recording media used in Embodiments 1 to 3 according to the present invention and layouts thereof will be described with reference to FIGS. 8 to 13.

Figure 8:
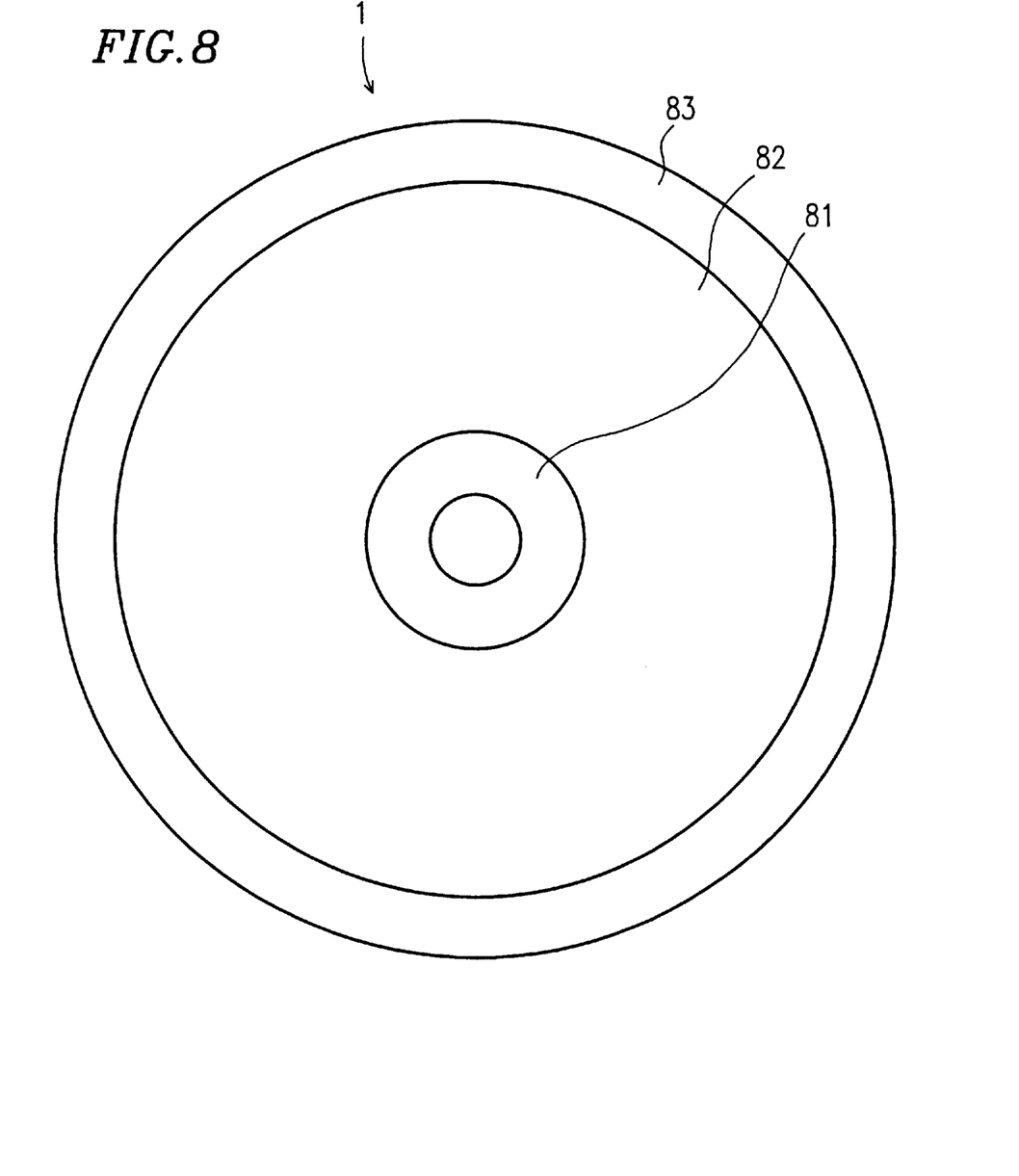
FIG. 8 is a diagram illustrating an information recording medium in Embodiment 4 according to the present invention.
Figure 9:
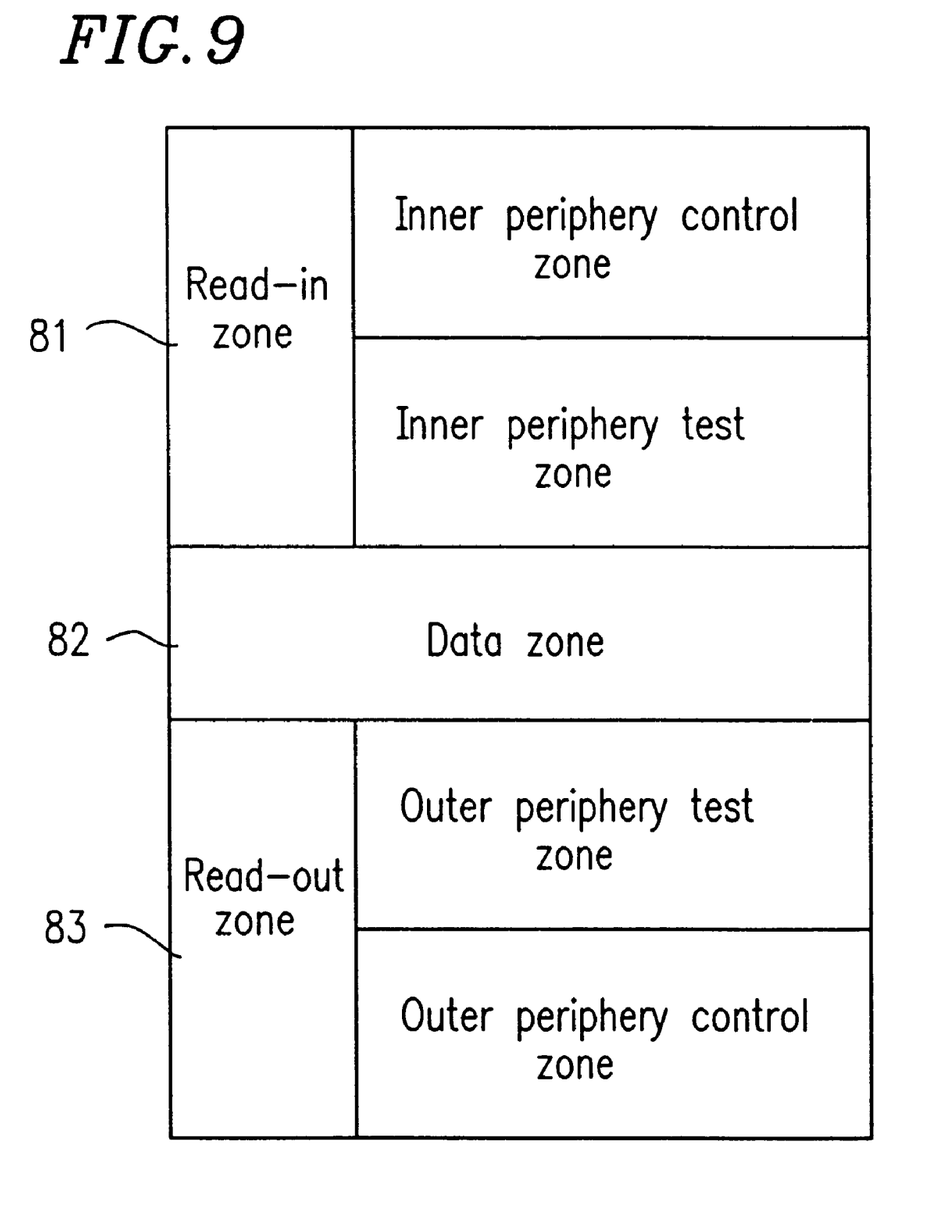
FIG. 9 is a diagram illustrating a layout of the information recording medium in Embodiment 4 according to the present invention.

Referring to FIGS. 8 and 9, a disk 1 includes a data zone 82 for recording/reproducing data, a read-in zone 81 provided on an inner periphery of the data zone 82, and a read-out zone 83 provided on an outer periphery of the data zone 82.

Figure 10:
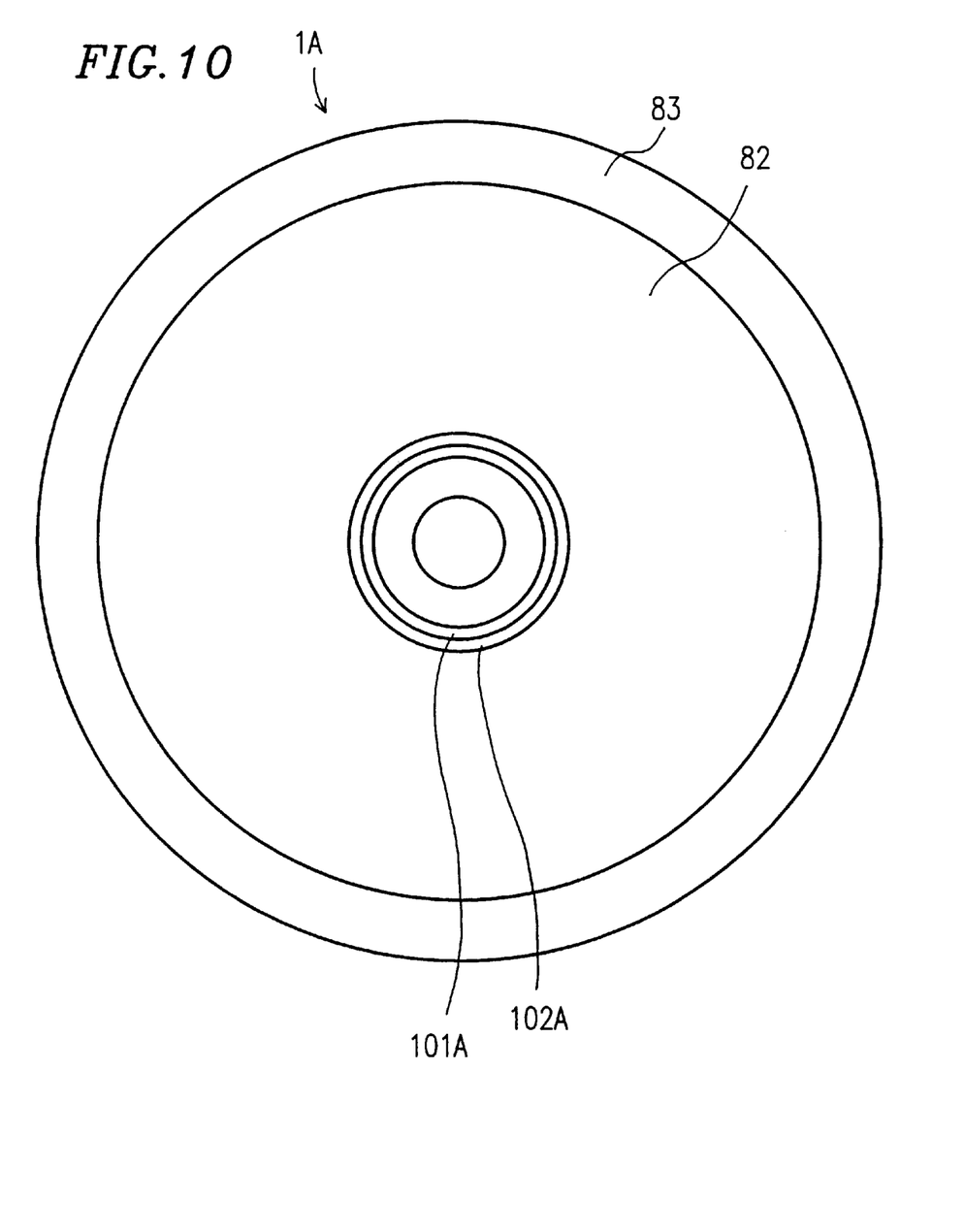
FIG. 10 is a diagram illustrating a first test region of the information recording medium in Embodiment 4 according to the present invention.

FIG. 10 shows an example in which a first test region is provided on an inner periphery with respect to the data zone 82 of a disk. A disk 1A includes a track 101A on which data is recorded and a track 102A for reproducing a signal, disposed adjacent to the track 101A on an inner periphery with respect to the data zone 82.

Figure 11:
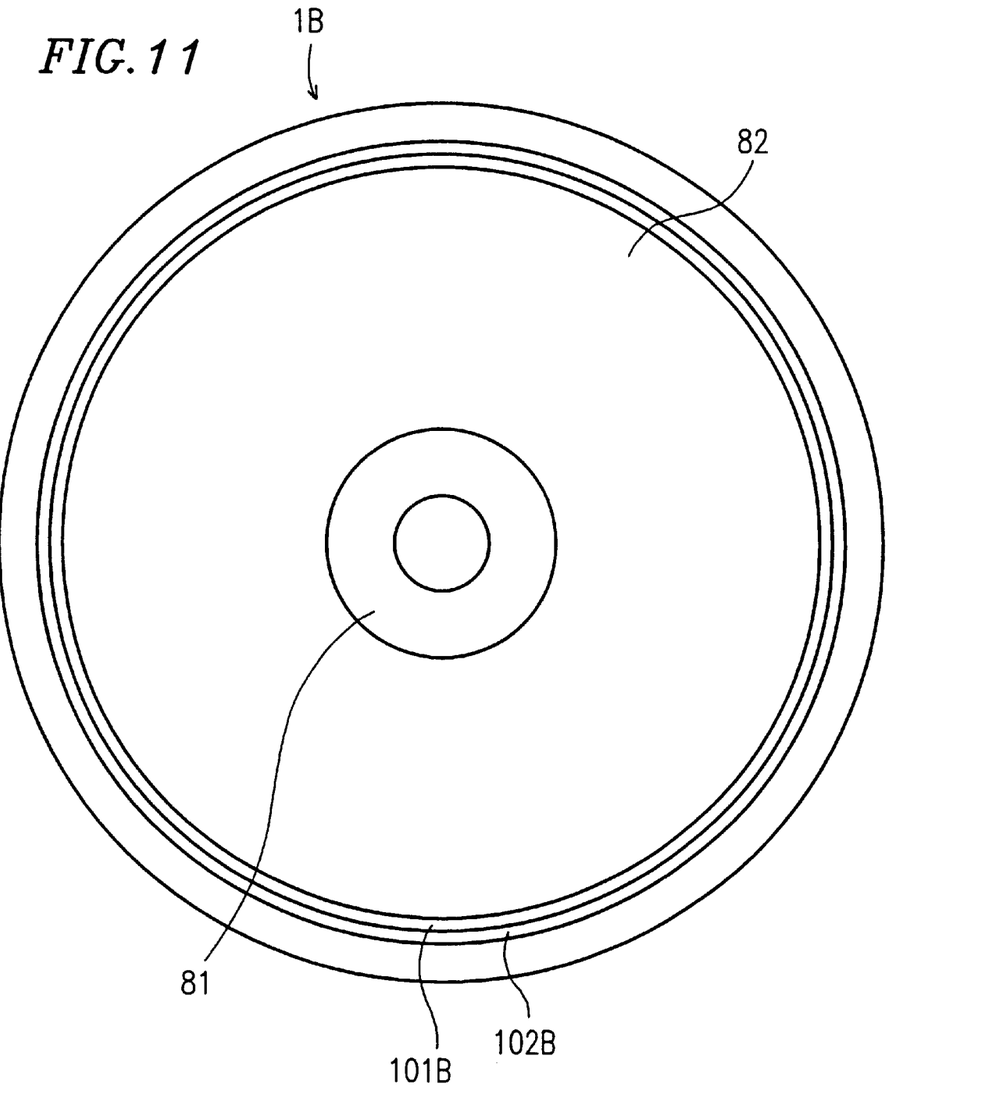
FIG. 11 is a diagram illustrating a second test region of the information recording medium in Embodiment 4 according to the present invention.

As shown in FIG. 11, a second test region may be disposed on an outer periphery with respect to the data zone 82. A disk 1B includes a track 101B on which data is recorded and a track 102B for reproducing a signal, disposed adjacent to the track 101B on an outer periphery with respect to the data zone 82.

For example, in the case where the disk is rotated at a constant linear speed, the test region may be provided on an inner or outer periphery with respect to the data zone.

Figure 12:
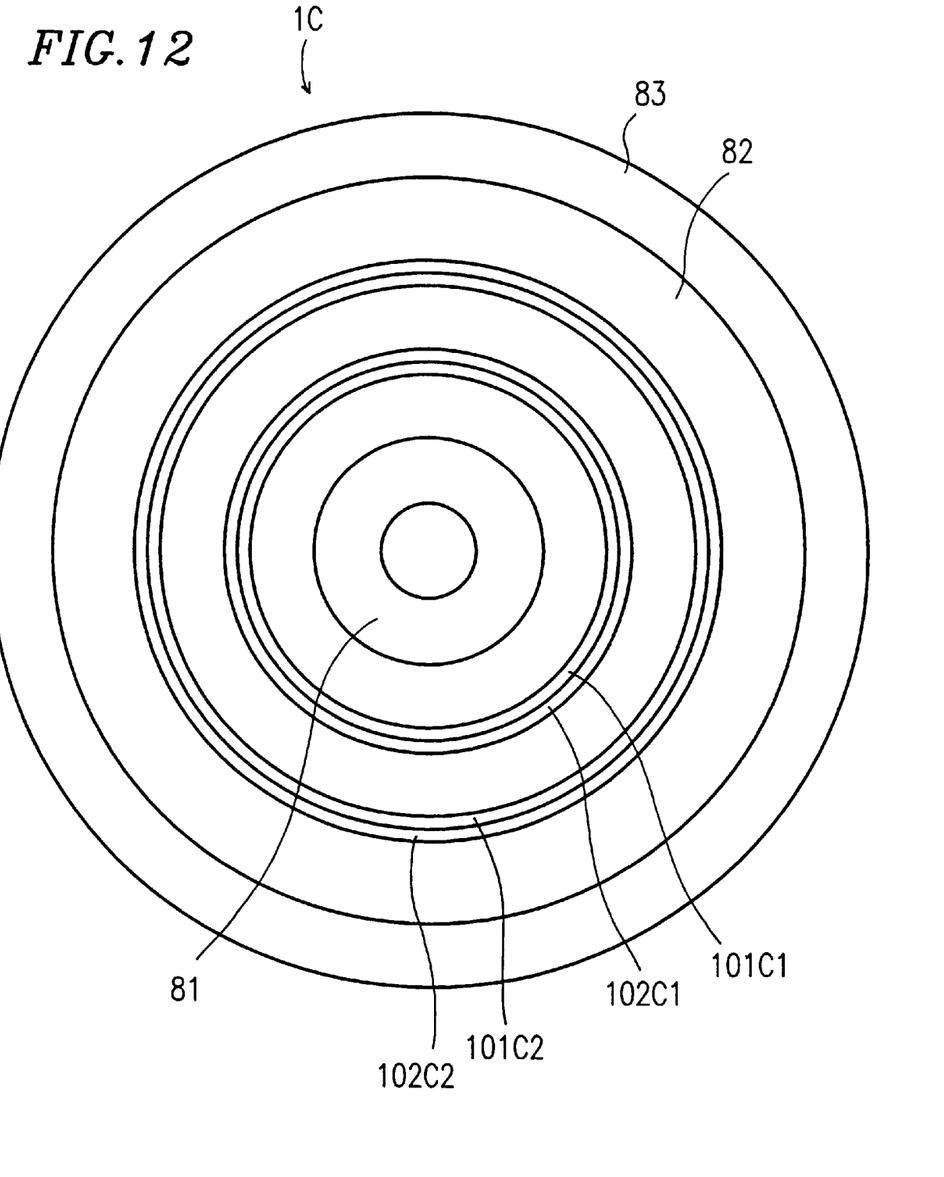
FIG. 12 is a diagram illustrating a third test region of the information recording medium in Embodiment 4 according to the present invention.

FIG. 12 shows an example in which a third test region is provided in the data zone 82. A track on which data is recorded and a track for reproducing a signal, disposed adjacent to the track on which data is recorded are provided in the data zone 82. A disk 1C includes a track 101C1 in which data is recorded and a track 102C1 for reproducing a signal, disposed adjacent to the track 101C1 in the data zone 82.

A track on which data is recorded and a track for reproducing a signal, disposed adjacent to the track on which data is recorded may be provided as a pair per a plurality of tracks. In addition to the tracks 101C1 and 102C1, the disk 1C includes a track 101C2 on which data is recorded and a track 102C2 for reproducing a signal, disposed adjacent to the track 101C2.

In the case where the disk is rotated at a constant angular speed, a linear speed varies depending upon the radius of the disk. Thus, it is effective to provide a pair of tracks for a test region for each of a plurality of data tracks.

Figure 13:
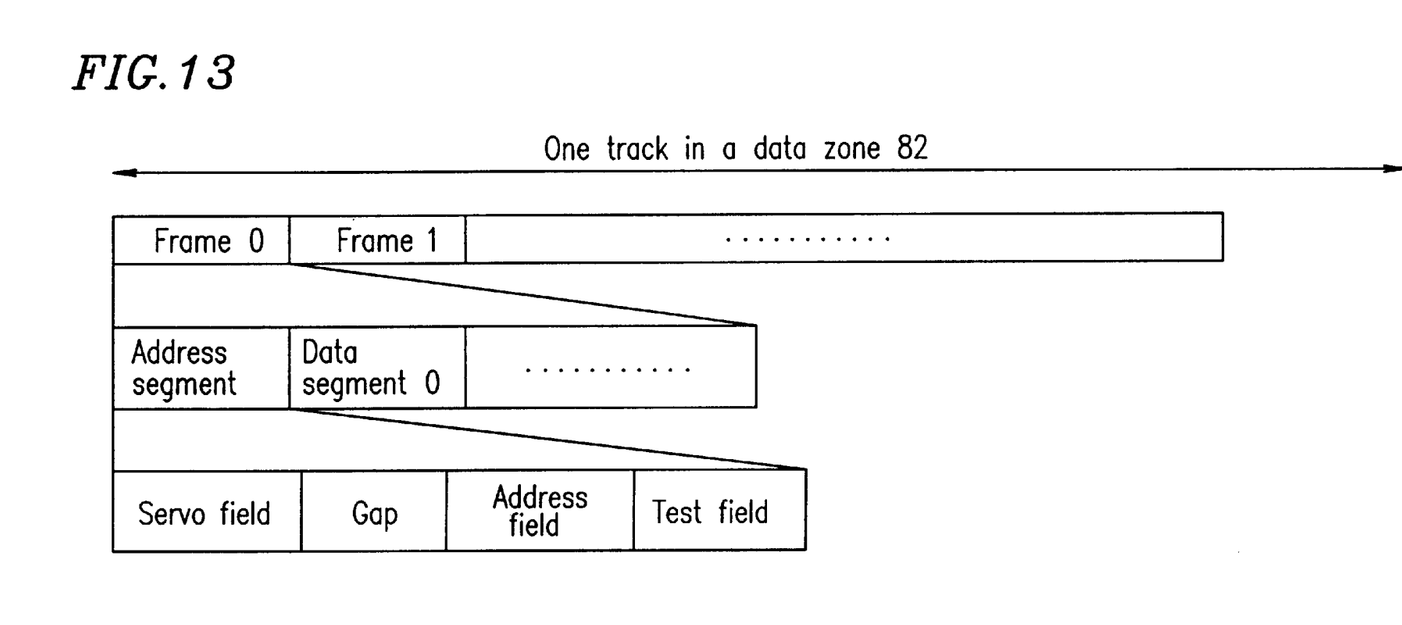
FIG. 13 is a diagram illustrating a layout of the information recording medium in Embodiment 4 according to the present invention.

Referring to FIG. 13, a layout of each track in a data zone in the case where a test region is provided in the data zone will be described. The data zone includes a plurality of tracks. Each of a plurality of tracks includes a plurality of frames. Each of a plurality of frames includes an address segment and a plurality of data segments. The address segment includes a test field, an address field, a gap, and a servo field. In this way, the test region is provided in the address segment of the data zone. In the test region, data is recorded or reproduced for determining an optimum laser output value.

A track on which data is recorded and a track for reproducing a signal, disposed adjacent to the track on which data is recorded may be provided on an inner or outer periphery with respect to the data zone of the disk, or on both peripheries.

As described above, the recording/reproducing apparatus according to the present invention is capable of writing test data on a track in a test region on an information recording medium while varying a laser output value and of obtaining an optimum recording laser output value by comparing a level of a reproduced signal from a track adjacent to the track on which the test data is written with a previously determined allowable level of a value of a signal generated by crosserase. Thus, even when an information recording medium is replaced or the surrounding environment changes, the apparatus can set an optimum recording laser output value in such a manner as to prevent the quality of a signal from degrading due to crosserase.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording/reproducing apparatus for recording data in or reproducing data from an information recording medium having a plurality of tracks, including:

a test data recording track for recording test data; and a test data reproducing track for reproducing a signal adjacent to the test data recording track on which the test data is recorded, the recording/reproducing apparatus comprising:

an optical head for outputting a laser beam;

a driving circuit for driving the optical head;

a signal level measuring device for measuring a level of a signal reproduced from the information recording medium; and a controller for erasing data on the test data reproducing track:

(a) controlling the driving circuit in such a manner that test data is recorded on the test data recording track after erasing data on the test data reproducing track using the laser beam output from the optical head, (b) controlling the driving circuit in such a manner that a signal is reproduced from the test data reproducing track after the test data is recorded on the test data recording track, (c) measuring a level of the signal reproduced from the test data reproducing track using the signal level measuring device, and (d) determining an optimum value of an output value of the laser beam output from the optical head in accordance with the level of the signal reproduced from the test data reproducing track.

2. A recording/reproducing apparatus according to claim 1, wherein the driving circuit drives the optical head in such a manner that the data is recorded on the test data recording track while varying the output value of the laser beam output from the optical head.

3. A recording/reproducing apparatus according to claim 2, wherein the driving circuit varies the output value of the laser beam by varying a power value of the laser beam.

4. A recording/reproducing apparatus according to claim 2, wherein the driving circuit varies the output value of the laser beam by varying a duty ratio of the laser beam.

5. A recording/reproducing apparatus according to claim 1, wherein the driving circuit drives the optical head in such a manner that the data is recorded on the test data recording track while varying a focus of the laser beam output from the optical head.

6. A recording/reproducing apparatus according to claim 1, wherein the plurality of tracks include a plurality of tracks having a first characteristic and a plurality of tracks having a second characteristic,
  one of the plurality of tracks having the first characteristic includes a test data recording track and one of the plurality of tracks having the second characteristic includes a test data reproducing track, which are disposed alternately, and
  the controller controls the driving circuit in such a manner that data is recorded on the test data recording track having the first characteristic and a signal is reproduced from the test data reproducing track having the second characteristic adjacent to the track on which the data is recorded.

7. A recording/reproducing apparatus according to claim 6, wherein the test data recording track having the first characteristic includes a plurality of tracks provided in either land portions or groove portions.

8. A recording/reproducing method for recording data in or reproducing data from an information recording medium having a plurality of tracks, including:
  a test data recording track for recording test data; and
  a test data reproducing track for reproducing a signal adjacent to the test data recording track on which the test data is recorded, the recording/reproducing method comprising:
  a first sequence of:
    (a) erasing data on the test data reproducing track,
    (b) recording test data on the test data recording track after erasing data on the test data reproducing track using a laser beam and,
    (c) reproducing a signal from the test data reproducing track after recording the test data on the test data recording track; and
  a second sequence of:
    (a) measuring a level of a signal reproduced from the test data reproducing track and
    (b) determining an optimum value of an output value of the laser beam in accordance with the level of the signal reproduced from the test data reproducing track.

9. A recording/reproducing method according to claim 8, wherein the first sequence includes recording the test data on the test data recording track while varying the output value of the laser beam.

10. A recording/reproducing method according to claim 9, wherein the output value of the laser beam is varied by varying a power value of the laser beam.

11. A recording/reproducing method according to claim 9, wherein the output value of the laser beam is varied by varying a duty ratio of the laser beam.

12. A recording/reproducing method according to claim 8, wherein the first sequence includes recording the test data on the test data recording track while varying a focus of the laser beam.

13. A recording/reproducing method according to claim 8, wherein the plurality of tracks include a plurality of tracks having a first characteristic and a plurality of tracks having a second characteristic,
  one of the plurality of tracks having the first characteristic includes a test data recording track and one of the plurality of tracks having the second characteristic includes a test data reproducing track, which are disposed alternately, and
  the first sequence includes recording data on the test data recording track having the first characteristic and reproducing a signal from the test data reproducing track having the second characteristic adjacent to the track on which the data is recorded.

14. A recording/reproducing method according to claim 13, wherein the plurality of tracks having the first characteristic include a plurality of tracks provided in either land portions or groove portions.

15. An information recording medium comprising a plurality of tracks for recording/reproducing data,
  the plurality of tracks including:
    a test data recording track for recording test data; and
    a test data reproducing track for reproducing a signal adjacent to the test data recording track on which the test data is recorded;
    wherein the data on the test data reproducing track is erased,
    test data is recorded on the test data recording track after erasing the data on the test data reproducing track, and
    a signal is reproduced from the test data reproducing track after the test data is recorded on the test data recording track.

16. An information recording medium according to claim 15, wherein the plurality of tracks include a plurality of tracks having a first characteristic and a plurality of tracks having a second characteristic,
  one of the plurality of tracks having the first characteristic includes a test data recording track and one of the plurality of tracks having the second characteristic includes a test data reproducing track, which are disposed alternately,
  data is recorded on the test data recording track having the first characteristic, and
  a signal is reproduced from the test data reproducing track having the second characteristic adjacent to the track on which the data is recorded.

17. An information recording medium according to claim 16, wherein the plurality of tracks having the first characteristic include a plurality of tracks provided in either land portions or groove portions.

18. An information recording medium according to claim 15, wherein the plurality of tracks include a track provided in a data zone and a test data recording track and a test data reproducing track provided in a fist zone,
  data is recorded on the test data recording track provided in the first zone, and
  a signal is reproduced from the test data reproducing track provided in the first zone adjacent to the test data recording track on which the data is recorded.

19. An information recording medium according to claim 18, wherein the first zone includes a zone provided on an inner periphery with respect to the data zone.

20. An information recording medium according to claim 19, wherein the first zone includes a zone provided on an outer periphery with respect to the data zone.

21. An information recording medium according to claim 18, wherein the first zone includes a zone provided on an outer periphery with respect to the data zone.

22. An information recording medium according to claim 18, wherein data is recorded on a test data recording track provided in the data zone, and a signal is reproduced from a test data reproducing track provided in the data zone adjacent to the test data recording track on which the data is recorded.

23. An information recording medium according to claim 22, wherein the data zone includes a second data zone divided per track under a predetermined condition, and the test data recording track and the test data reproducing track are provided per the second data zone.

* * * * *